US005964519A

United States Patent [19]
Chun-Ying

[11] Patent Number: 5,964,519
[45] Date of Patent: Oct. 12, 1999

[54] READING LAMP ASSEMBLY

[76] Inventor: Lin Chun-Ying, P.O. Box 82-144, Taipei, Taiwan

[21] Appl. No.: 08/934,653

[22] Filed: Sep. 22, 1997

[51] Int. Cl.$^{6}$ .............................. F21V 33/00; H04M 1/22
[52] U.S. Cl. ................................ 362/253; 362/86; 362/96
[58] Field of Search ................................ 362/86, 96, 253, 362/411, 414; 313/134

[56] References Cited

U.S. PATENT DOCUMENTS 4,549,250 10/1985 Spector ..................................... 362/96
4,965,855 10/1990 Tsuji ........................................ 455/344

*Primary Examiner*—Cassandra Spyrou
*Assistant Examiner*—Jared Treas
*Attorney, Agent, or Firm*—A & J

[57] ABSTRACT

A reading lamp assembly includes a reading lamp and a timer circuit, a music box, and a fragrance holder provided on a base of the reading lamp. The reading lamp goes out after a set interval of time, and the music box starts playing and the fragrance in the fragrance holder begins spreading after the lamp goes out. Therefore, the user may, after reading for a period of time, relaxes himself/herself in the music and the fragrance.

1 Claim, 3 Drawing Sheets

READING LAMP ASSEMBLY

BACKGROUND OF THE INVENTION

1. Field of the Invention

This invention relates generally to a reading lamp, and more particularly to a reading lamp which emits light that does not hurt the user's eyes and which automatically releases a fragrance after the light automatically turns off.

2. Description of the Prior Art

With more and more children and teenagers suffering from myopia, it is imperative to provide a reading lamp which provides sufficient light for reading yet the light does not hurt the eyes, and which provides some means of relaxation for the user after the light is off.

Therefore, it is an object of the present invention to provide reading lamp assembly which can obviate and mitigate the above-mentioned drawbacks.

SUMMARY OF THE INVENTION

This invention relates generally to a reading lamp, and more particularly to a reading lamp which emits light that does not hurt the user's eyes and which automatically releases a fragrance after the light automatically turns off.

A primary object of the present invention is to provide a reading lamp assembly which includes a reading lamp, a music box, and a fragrance holder. The lamp goes out after a set period of time, and the music box starts to play and the fragrance in the fragrance in the fragrance holder begins spreading through the air so that the user may relax in the music and fragrance after reading.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
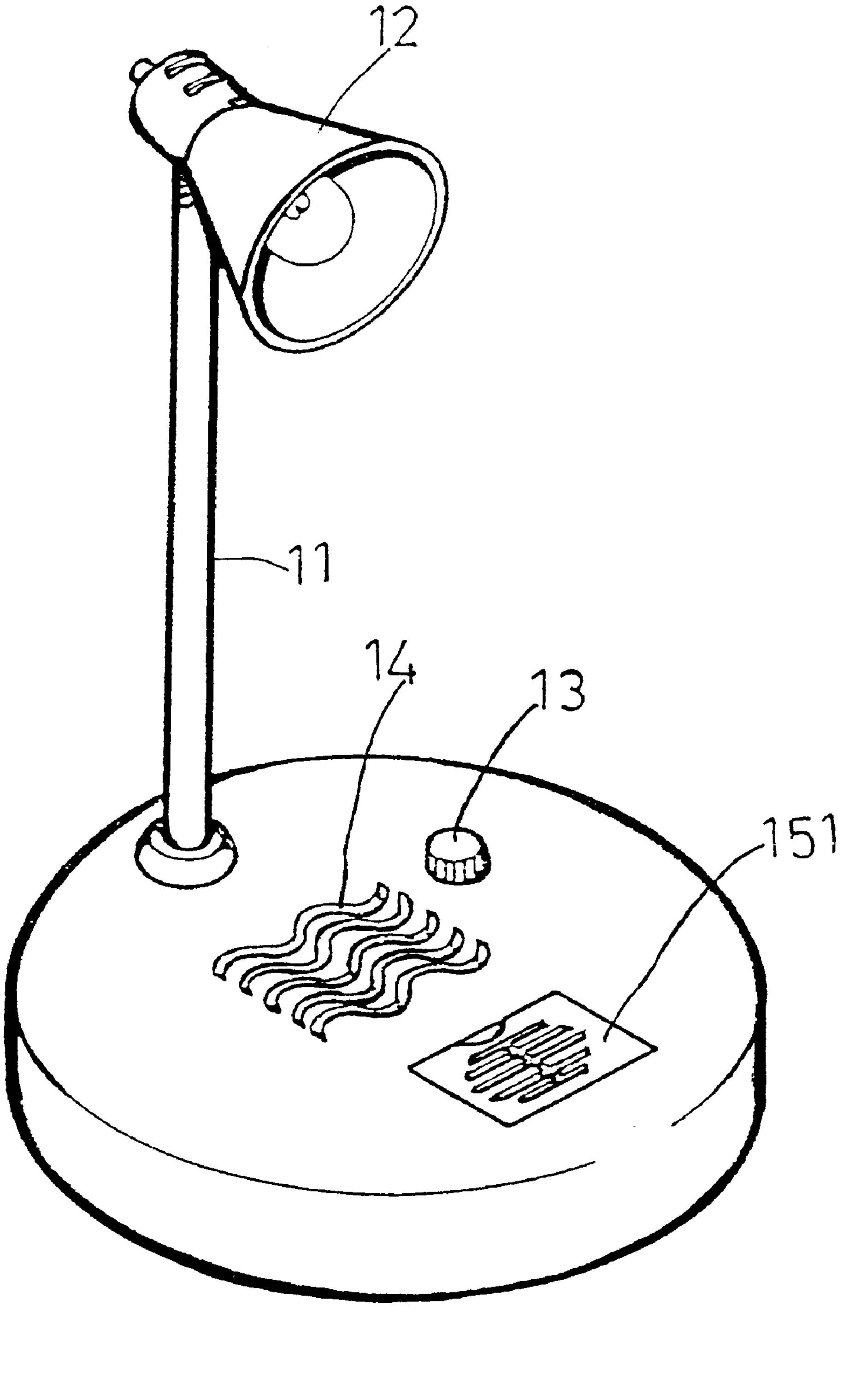
FIG. 1 is an elevational view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
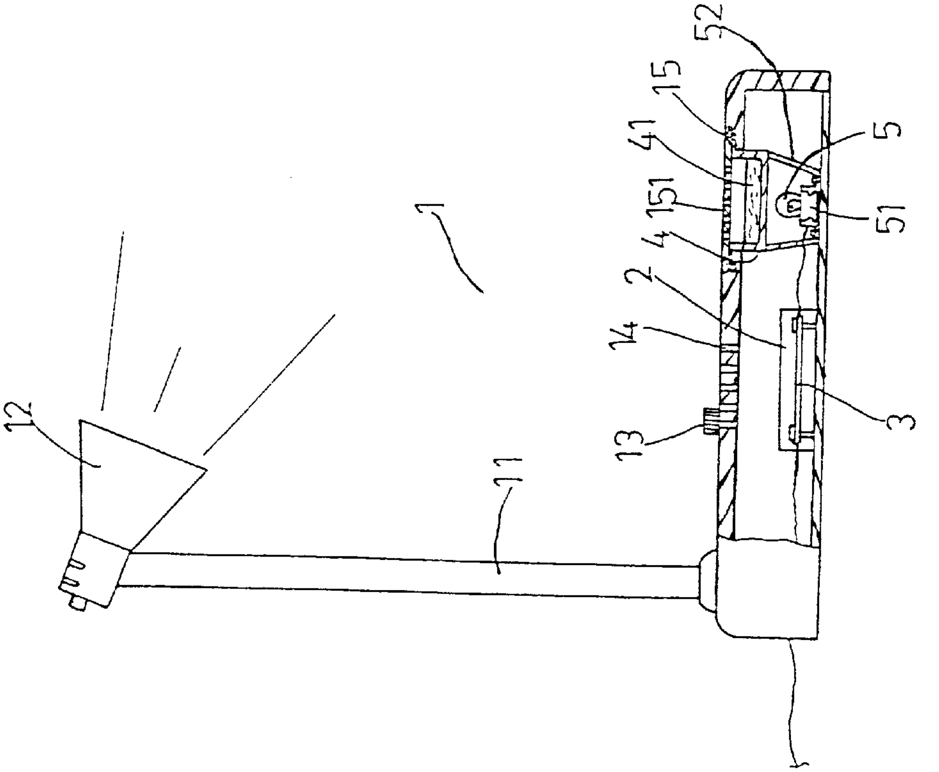
FIG. 2 is a sectional view of the present invention.

With reference to FIGS. 1 and 2, the present invention essentially comprises a body 1, a music box 2, a timer circuit 3, a fragrance holder 4, and a night light 5.

The body 1 includes a base having an interior, a top side, and a bottom side. The base has a post 11 and a reading lamp 12 fixedly disposed thereon. On the top side of the body 1 at appropriate positions, a turning switch 13, a sound emitting slot 14, a fragrance holder hole 15 are insertably provided. The switch 13 allows adjustment of the luminosity of the light and is electrically connected to both the timer circuit 3 and the reading lamp 12. The fragrance holder hole 15 has a suitable diameter, and a cover 151 may be insertably fitted over the fragrance holder hole 15.

The music box 2 is fixedly inserted into the body 1 and accommodates therein an electronic circuit and speaker for playing various pieces of music. As such electronic circuit is a conventional one and not a feature claimed in the present invention, it is not discussed in detail herein.

The timer circuit 3 is fixedly provided in the interior of the body 1 at the bottom. The timer circuit 3 counts upon the turning on of the reading lamp 12. The timer circuit 3 provides a two-step control. When the first interval of time arrives, the first step control is performed. When the second interval of time arrives, the second step control is performed. Then the cycle begins anew. The length of the intervals of time is adjustable. As the timer circuit 3 is also a conventional circuit and not a feature of the present invention, it will not be discussed further herein.

The fragrance holder 4 includes a housing that is prone to heat and thermally conductive. The size and shape of the housing are so configured as to allow the housing to be received and concealed in the fragrance holder hole 15. A suitable amount of fragrance 41 may be poured in the fragrance holder 4.

The night light 5 includes a light holder 51 below the fragrance holder hole 15, and an incandescent light bulb is fixedly disposed in the light holder 51. A stop element 52 extends upwardly from the periphery of the light holder 51 to a suitable height for avoiding loss of heat.

In assembling the present invention, the timer circuit 3 and the music box 2 are respectively secured in the interior of the body 1 at the bottom. Then the night light 5 is screwably secured in the light holder 51. The fragrance holder 4 with the fragrance 41 poured therein is insertably placed in the fragrance holder hole 15, and the cover 151 is put in place.

Figure 4:
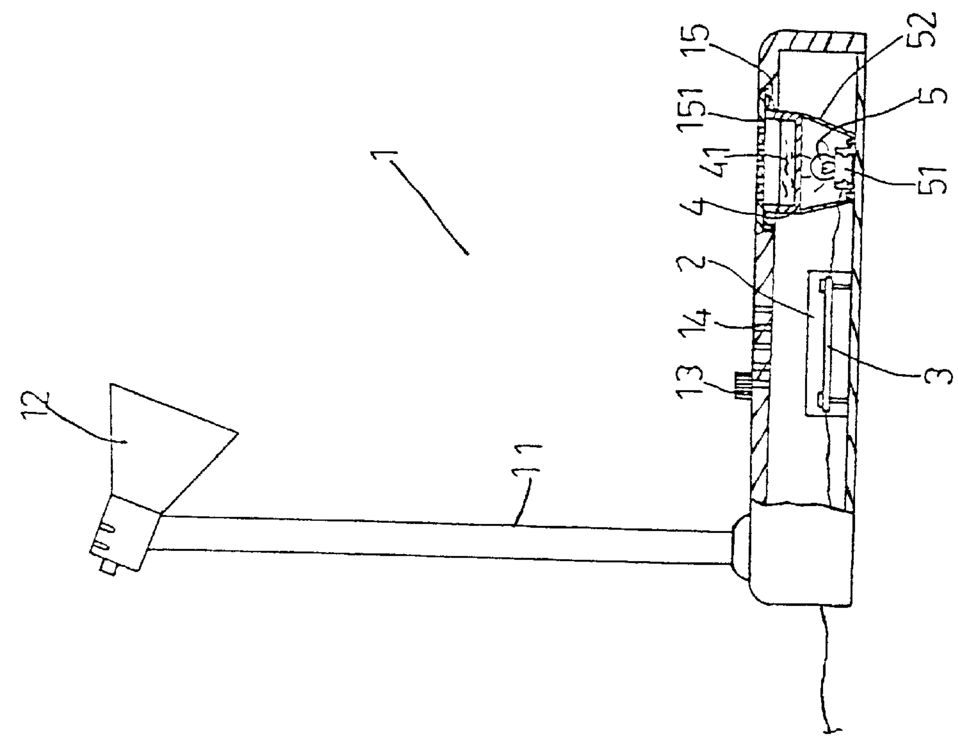
FIG. 4 is a schematic view of the operation of the present invention.
Figure 3:
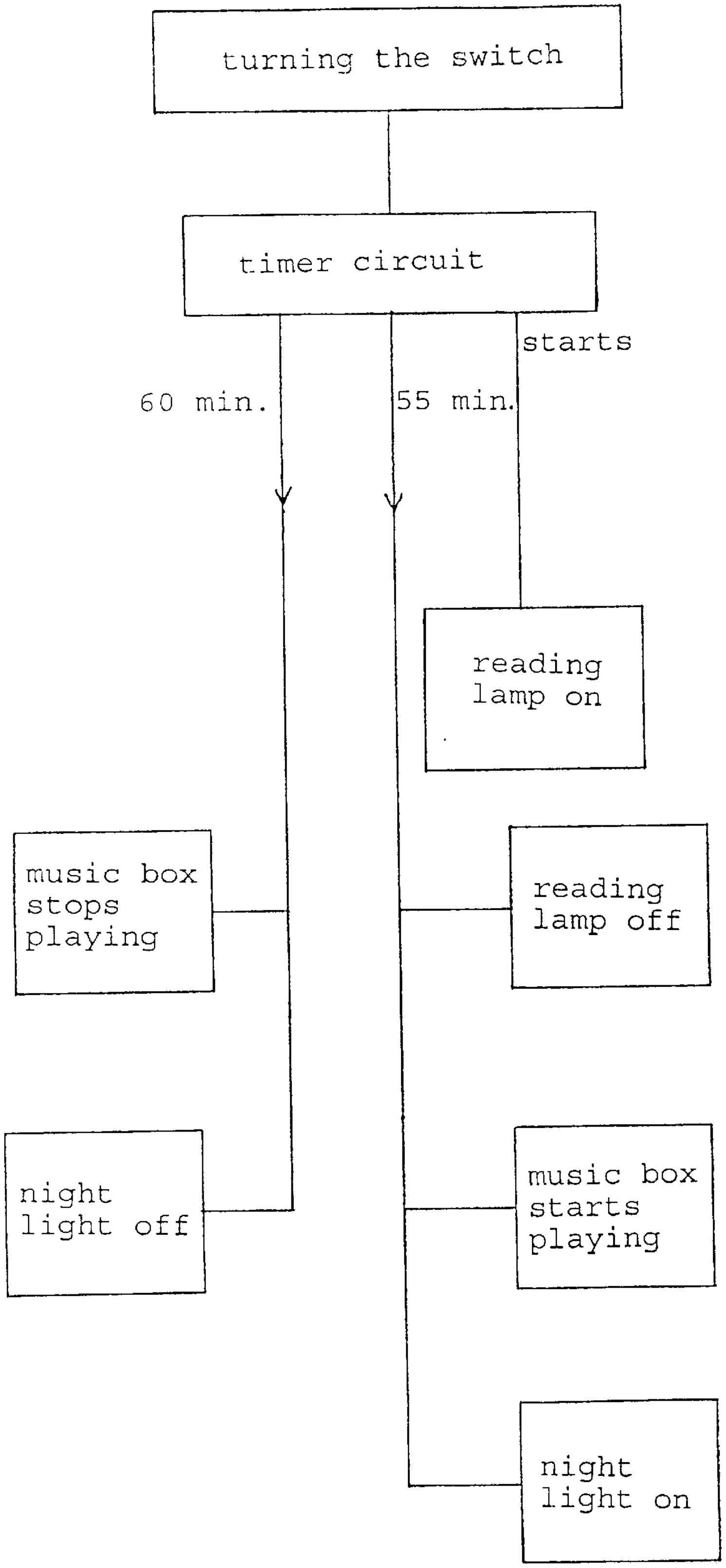
FIG. 3 is a block diagram of the operation of the present invention.

Suppose the first interval of time is 55 minutes, and the second interval of time is 60 minutes (see FIG. 3), when the user utilizes the present invention in reading, he/she only needs to turn the switch 13 to switch on the reading lamp 12 until a desirable luminosity is obtained. At the same time, the timer circuit 3 will start counting. After 55 minutes (see FIG. 4), the timer circuit 3 will firstly cut off power supply to the reading lamp 12 and then start the music box 2, the music coming out from the sound emitting slot 14, turn on the night light 5 so that the heat generated by the night light causes the fragrance 41 in the fragrance holder 4 to quickly spread through the air. The fragrance holder 4 may be made of colored, translucent glass material so that the light of the night light 5 penetrates the fragrance holder 4 to create a pleasing visual effect. After 60 minutes, the timer circuit 3 will cut off power supply to the music box 2 and the night light 5 and start counting anew. The reading lamp 12 is turned on, and another cycle can begin.

According to the present invention, when the user reads under the reading lamp 12, the reading lamp 12 will automatically turn off after a certain period of time to alert the user to stop reading for a while and rest. At the same time, the night light 5 will turn on to help disperse the fragrance 41, and the music box 2 will start playing light music, so that the user, while resting his/her eyes, may enjoy the fragrance and the music and relax himself/herself completely.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A reading lamp assembly, comprising a body, a music box, a time circuit, a fragrance holder, and a night light, wherein said body includes a base having an interior, a top side and a bottom side, said body having a lamp post, a reading lamp, and a turning switch provided on said top side thereof, and being formed with sound emitting slot and a fragrance holder hole, said switch being adjustable to allow adjustment the luminosity of said reading lamp and being connected to said timer circuit and said reading lamp, said fragrance holder hole having a suitable diameter;

said music box is insertably disposed in said body and accommodates therein a electronic circuit and speaker for playing various pieces of music;

said timer circuit is fixedly secured in said interior of said body at the bottom, said timer circuit starts counting when said switch is turned on and provides a two-step control in which a first step control will start after a first set interval of time has arrived and a second step control will start after a second set interval of time has arrived, and said timer circuit starts counting anew when the second set interval of time is up, the length of the intervals of time being adjustable;

said fragrance holder includes a housing made of heat conductive material, said housing being shaped and sized to fit in said fragrance holder hole in said body and being adapted to receive a suitable amount of fragrance; and said night light includes a light holder disposed below said fragrance holder and an incandescent light bulb;

whereby after being turned on, said reading lamp automatically turns off after a certain period of time, and with the turning off of said reading lamp, said music box starts playing and said night light is on, the heat generated by said night light causing the fragrance in said fragrance holder to disperse, said music box stops playing and said night light automatically goes out, and said reading lamp is on again, the cycle being repeatable so that the user can, after reading for certain periods of time, get relaxation from the music and fragrance.

* * * * *